US009112846B2

(12) United States Patent
Kwok (10) Patent No.: US 9,112,846 B2
(45) Date of Patent: Aug. 18, 2015

(54) METHOD AND APPARATUS FOR TRANSMITTING ADDITIONAL AUTHORIZATION DATA VIA GSSAPI

(71) Applicant: Centrify Corporation, Sunnyvale, CA (US)

(72) Inventor: Hon Wai Kwok, Sunnyvale, CA (US)

(73) Assignee: CENTRIFY CORPORATION, Sunnyvale, CA (US)

( * ) Notice: Subject to any disclaimer, the term of this patent is extended or adjusted under 35 U.S.C. 154(b) by 20 days.

(21) Appl. No.: 14/052,600

(22) Filed: Oct. 11, 2013

(65) Prior Publication Data

US 2015/0106906 A1 Apr. 16, 2015

(51) Int. Cl.
*G06F 7/04* (2006.01)
*H04L 29/06* (2006.01)

(52) U.S. Cl.
CPC ...................................... *H04L 63/08* (2013.01)

(58) Field of Classification Search
None
See application file for complete search history.

(56) References Cited

U.S. PATENT DOCUMENTS

| | | | | |
|---|---|---|---|---|
| 6,775,783 | B1 * | 8/2004 | Trostle | 726/6 |
| 2003/0005280 | A1 * | 1/2003 | Bobde et al. | 713/150 |
| 2004/0030764 | A1 * | 2/2004 | Birk et al. | 709/223 |
| 2005/0005090 | A1 * | 1/2005 | Venkataramappa et al. | 713/150 |
| 2007/0277231 | A1 * | 11/2007 | Medvinsky et al. | 726/5 |
| 2007/0283163 | A1 * | 12/2007 | Relyea | 713/184 |
| 2008/0086472 | A1 * | 4/2008 | Gao et al. | 707/9 |
| 2008/0196101 | A1 * | 8/2008 | Sade et al. | 726/22 |
| 2013/0179952 | A1 * | 7/2013 | O'Donnell et al. | 726/6 |
| 2013/0232546 | A1 * | 9/2013 | Shimono | 726/3 |
| 2014/0032758 | A1 * | 1/2014 | Barton et al. | 709/225 |

* cited by examiner

*Primary Examiner* — Kaveh Abrishamkar
(74) *Attorney, Agent, or Firm* — Blakely Sokoloff Taylor & Zafman (57) ABSTRACT

A system and method for using a GSSAPI security token to transport additional non-GSSAPI data that includes authorization data used by third-party software. The system includes a hook that intercepts a client process's interactions with the GSSAPI. When a client process requests a security context from the GSSAPI, the hook intercepts the security token the GSSAPI provides for the client process. The hook checks to see if there is additional authorization data to transport, adds the additional data to the security token, then gives the token to the client process. The client process sends the security token to the server process, which submits the token to the GSSAPI for evaluation. A hook on this computer intercepts the security token, removes additional data added earlier, gives the added authorization data to a version of the third-party authorization software, then passes the now-unaltered security token to the server process which uses the security token to finish establishing a security context with the client process.

8 Claims, 6 Drawing Sheets

METHOD AND APPARATUS FOR TRANSMITTING ADDITIONAL AUTHORIZATION DATA VIA GSSAPI

BRIEF DESCRIPTION OF THE INVENTION

Embodiments of this invention use the Generic Security Service Application Program Interface (GSSAPI) and its derivations to transmit additional authorization data when a client application on one computer uses the GSSAPI to establish a security context between a client process on one computer with a server process on a second computer.

Operating systems such as Windows and UNIX often offer the GSSAPI to extend a user's authentication and authorization on one computer to a second computer. The operating system (OS) use security protocols underlying the GSSAPI to transmit custom authorization data such as the user's permissions, group memberships, and other information that determines what actions the user may take on the second computer.

The OS does not, however, allow processes operating on the first computer to add their own authorization data to accompany the OS's authorization data through the GSSAPI. If a process running on the first computer must transmit authorization data to a corresponding process running on the second computer, the first process must negotiate its own connection to the second computer and transmit its authorization data, something not always possible through the extended user session. This prevents valuable extended-authorization processes such as role-defining processes from working correctly.

An embodiment of this invention on one computer monitors the operating system's requests to extend a client process's user authentication and authorization via the GSSAPI to a server process on a second computer. The embodiment also monitors other processes that may require their authorization to extend to the second computer for this client-server connection. When the embodiment determines that a client-server connection request should be accompanied by a process's non-OS authorization data, the embodiment adds the non-OS authorization data to a security token exchanged between the client and server processes by the GSSAPI.

An embodiment of the invention on the second computer intercepts the GSSAPI security token before it is used by the server process, removes the non-OS authorization data, and then passes the security token on for the server process to use to extend the client process's authorization on the second computer. The embodiment then makes the non-OS authorization data available to processes on the second computer that use that data to extend the user's authorization in the server process.

BACKGROUND

Networked computers allow a user on one computer to extend his authentication and authorization in a client process to server processes on other computers on the network so that the user may work using processes and resources available on those computers. Most common operating systems such as Windows and UNIX variants provide this capability.

Extending a User's Authentication and Authorization

When a user logs onto a computer, the operating system authenticates and authorizes the user. Authentication typically requires the user to enter a user name and a password which the computer's operating system (OS) checks against a central directory of user accounts; authorization typically requires the OS to check the user's account in the central directory to see what permissions the user has to use resources on the computer and the network. A user using process while logged on may only perform actions for which he has authorization.

Figure 1:
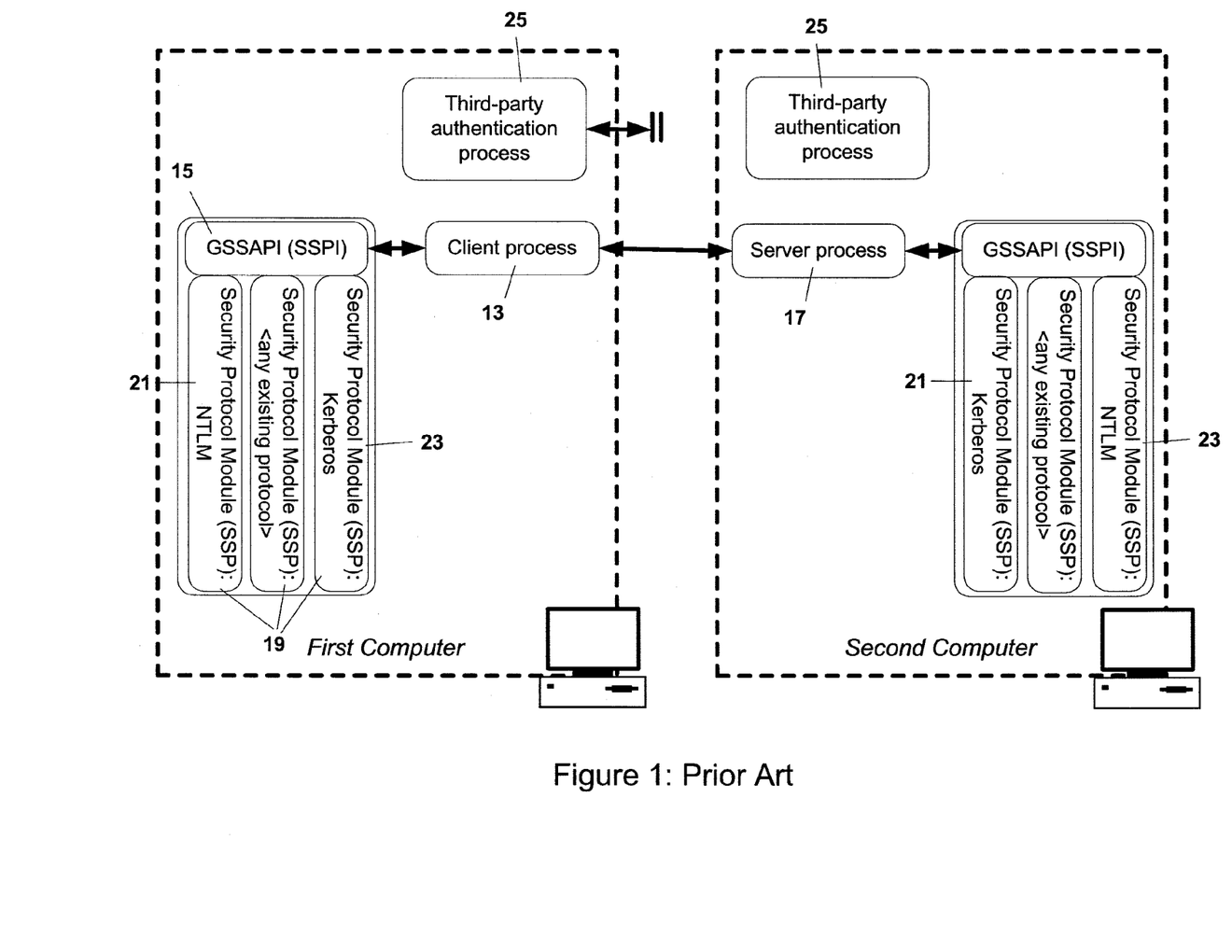
FIG. 1 is a block diagram that shows OS and GSSAPI components as they exist in establishing a security context between computers in prior art.

Referring to FIG. 1, when a user on one computer wishes to use a client process 13 to perform actions on a server process 17 on a second computer via a network connection, the operating systems running on each computer may communicate via a security protocol to agree to extend the user authentication and authorization on the client process to the server. This extension allows the user to work on the second computer without once again logging on to the computer and re-entering credentials such as a user name and password.

The extension of user authentication and authorization from a client process to a server process via a security protocol is called a security context. A security context ensures secure communication between the two computers and establishes trust in the user's authentication and authorization on both computers.

A variety of security protocols can establish a security context by first exchanging authentication and authorization data between client and server processes and then by encoding all other communications between the processes. Two of the most common security protocols are Kerberos and NTLM (NT LAN Manager), although there are numerous others and more may be developed to address future security concerns.

Each security protocol has its own syntax and data requirements that each of the two connecting computer processes must satisfy. If a process is written to use one security protocol, the process can't make connections to a second process that uses a different security protocol. The first process must be altered to be able to use the second process's security protocol before the two processes can make a connection.

When processes use a security protocol to establish a security context, the security protocol provides a way to send authentication data to extend the user's authentication from the first process to the second process. Many security protocols also provide mechanisms to transmit authorization data from the first process to the second process. This authorization data is typically OS-specific, and is used to extend authorization between two computers running the same OS.

GSSAPI

The computer industry created the Generic Security Service Application Program Interface (GSSAPI) 15 to provide a common interface for a variety of underlying security protocols. The GSSAPI is implemented as a set of modules 19 that each implement a different security protocol such as Kerberos 23 or NTLM 21. A process that uses the GSSAPI works with a generic interface that abstracts the specifics of all the underlying security protocols.

To establish a security context with a second process, a process using the GSSAPI uses a set of GSSAPI function calls instead of working directly with a security protocol's own function calls. The GSSAPI interprets any calls it receives into the correct syntax for an underlying security protocol. A process may, for example, ask the GSSAPI to transmit secure data to a second process using a specific syntax such as Kerberos or NTLM. The GSSAPI uses the specified security protocol module to do so, and translates the process's request into the proper syntax for the selected security protocol.

The GSSAPI is in common use in today's operating systems. Some OSs, such as Microsoft Windows, have their own variety of the GSSAPI. Windows, for example, uses a variant called the Security Support Provider Interface (SSPI). The SSPI implements underlying security protocol modules as a set of Security Support Providers (SSPs) that each implements a different security protocol such as Kerberos or NTLM.

Figure 3A:
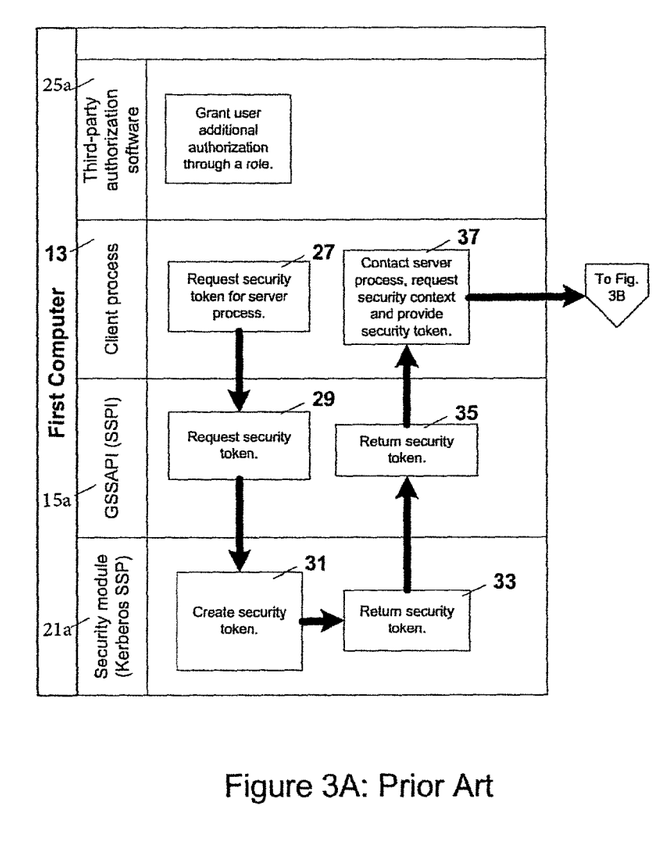
FIGS. 3A and 3B are flowcharts that show how an OS and the GSSAPI establish a security context between two computers in prior art.
Figure 3B:
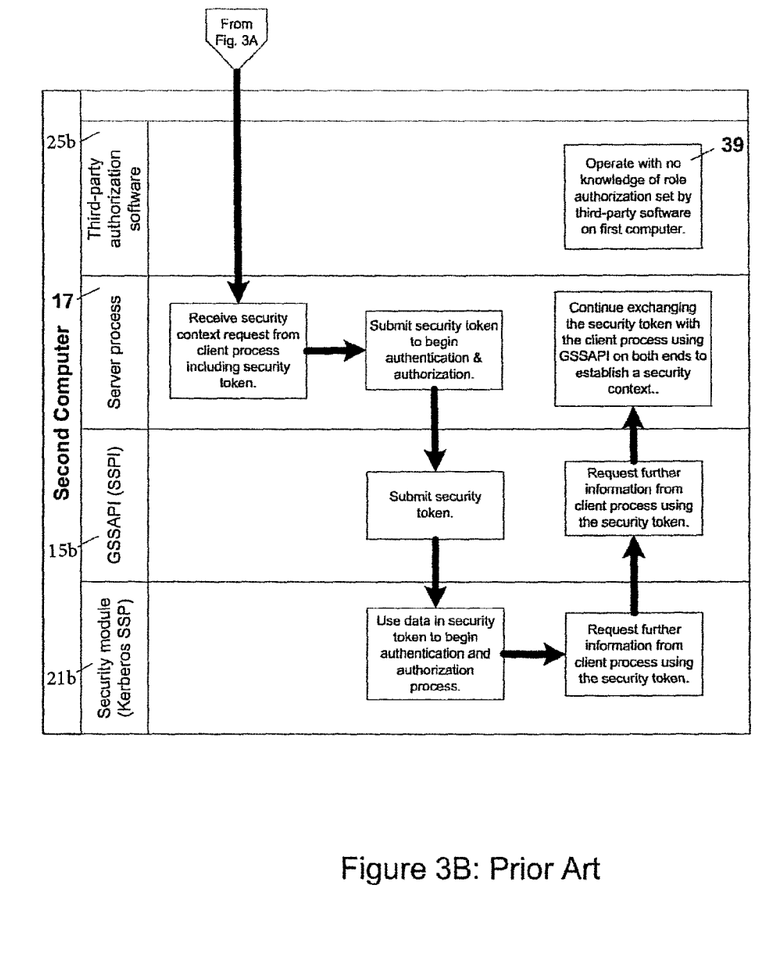

With reference to FIGS. 3A and 3B, in the prior art, to establish a security context between two processes, the GSSAPI 15 on the client process's computer creates a security token using an underlying security protocol, which typically uses the authentication and authorization defined for the process's user by the computer's operating system. The security token contains information necessary for the underlying security protocol to establish trust between the two processes. The token's contents vary depending on the security protocol.

The client process 13 exchanges the provided security token with the server process, which uses the GSSAPI 15 on the server computer to verify authentication and authorization using the agreed-upon security protocol. Without a security token exchange, the two processes cannot establish a security context between themselves.

Third-Party Authorization

An operating system may establish authorization for a user session on a single computer using a variety of permission specifications. The user ID used to log on to the user session is typically associated with a set of permissions (authorization data) in a directory service that the OS consults when the user first authenticates. The permissions define the user session's authorization.

Some third-party processes 25 may establish further authorization for a user session using methods that go outside of the operating system's normal authorization methods. A typical example is a third-party process that implements roles. A user can assume different roles within a single user session. Each role the user assumes has different authorization and provides more or fewer permissions all associated with a single user ID.

Third-party authorization processes often change authorization by working outside of the operating system's standard authorization methods. The third-party processes may maintain their own non-OS authorization data in their own database, or within the central directory service. These processes require their own authorization data in order to work.

Problems with Prior Art

When a client process 13 connects to a server process using the GSSAPI, the client process 13 first requests 27 a security token from the GSSAPI. The GSSAPI 15 requests 29 a security token from a specified security module 21, which creates a security token for the user. The security module 21 then returns 33 the security token to the GSSAPI 15, which in turn returns 35 the security token to the client process 13.

The client process 13 transmits 37 the security token using a network connection to the server process, which then proceeds to exchange the security token back and forth with the client process in a handshake process that establishes the user's authentication and authorization in the server process. The authorization data conveyed by the security token was created by an operating system that does not recognize authorization granted by third-party processes, so the security token does not transmit non-OS authorization data when it establishes a security context between the two processes.

The GSSAPI does not offer any method of adding non-OS authorization data to a security token when establishing a security context, so a third-party process may not use the GSSAPI to transmit its non-OS authorization data.

Because third-party processes can't transmit non-OS authorization data via the GSSAPI when the GSSAPI establishes a new security context, the user won't have his non-OS authorization extended from a client process to a server process. Third-party authorization features such as roles won't work across a security context established via the GSSAPI. As a result, the third party authorization software 25 operates 39 with no knowledge of role authorization set by third party software on the first computer as shown in FIG. 3B.

A third-party process running on the first computer may contact on its own the third-party process running on the second computer to transmit custom authorization data, but to do so the third-party processes must overcome many challenges. The process on the first computer must open a port on the second computer to communicate with the process on the second computer, which requires a change to firewall permissions on the second computer, a procedure that relies on an administrator to carry out and that is often difficult. The process on the second computer must authenticate and authorize the process on the first computer to ensure that the connection and transmitted data are valid, which requires a whole new layer of security protocol interchange and added network and processing resources. And once the two processes communicate with each other, the process on the second computer can't easily know for which client-server connection it's receiving custom authorization data if more than one user attempts to connect to a server process on the second computer (a common occurrence for server computers).

SUMMARY OF THE INVENTION

Embodiments of the invention modify the GSSAPI that is resident on computers that establish security contexts via the GSSAPI. An embodiment's modification adds a detection and alteration layer (a "hook") within the GSSAPI interface. The hook monitors GSSAPI and selected third-party process actions to detect two conditions:

a) When a client process sends a request to the GSSAPI for a security context to connect to a server process.

b) When a third-party authorization process has extended authorization in effect that requires non-OS authorization data to extend to the security context established for the client-server connection.

When an embodiment of the invention detects both of these conditions, it intercepts the security token that the GSSAPI creates to send to the second computer. The embodiment accepts any non-OS data that the third-party software must transmit for the security context and adds that non-OS data to the security token. The embodiment then returns the security token to the GSSAPI, which gives the token to the client process to send to the server process.

An embodiment of the invention within the GSSAPI on the server process's computer detects the received security token and intercepts the token before the GSSAPI returns the token to the server process. The embodiment removes the non-OS data from the security token and passes the now non-modified token back to the GSSAPI, which gives the token to the server process so the client and server processes can establish a security context. The embodiment then passes the retrieved non-OS data to the appropriate third-party process on the server process's computer so the third-party process can establish its own authority on this computer for the newly established security context.

BRIEF DESCRIPTION OF THE DRAWINGS

Embodiments of the invention are illustrated by way of example and not by way of limitation in the figures of the accompanying drawings in which like references indicate similar elements. It should be noted that references to or "one" embodiment in this disclosure are not necessarily to the same embodiment, and such references mean "at least one."

DETAILED DESCRIPTION OF THE INVENTION

Figure 2:
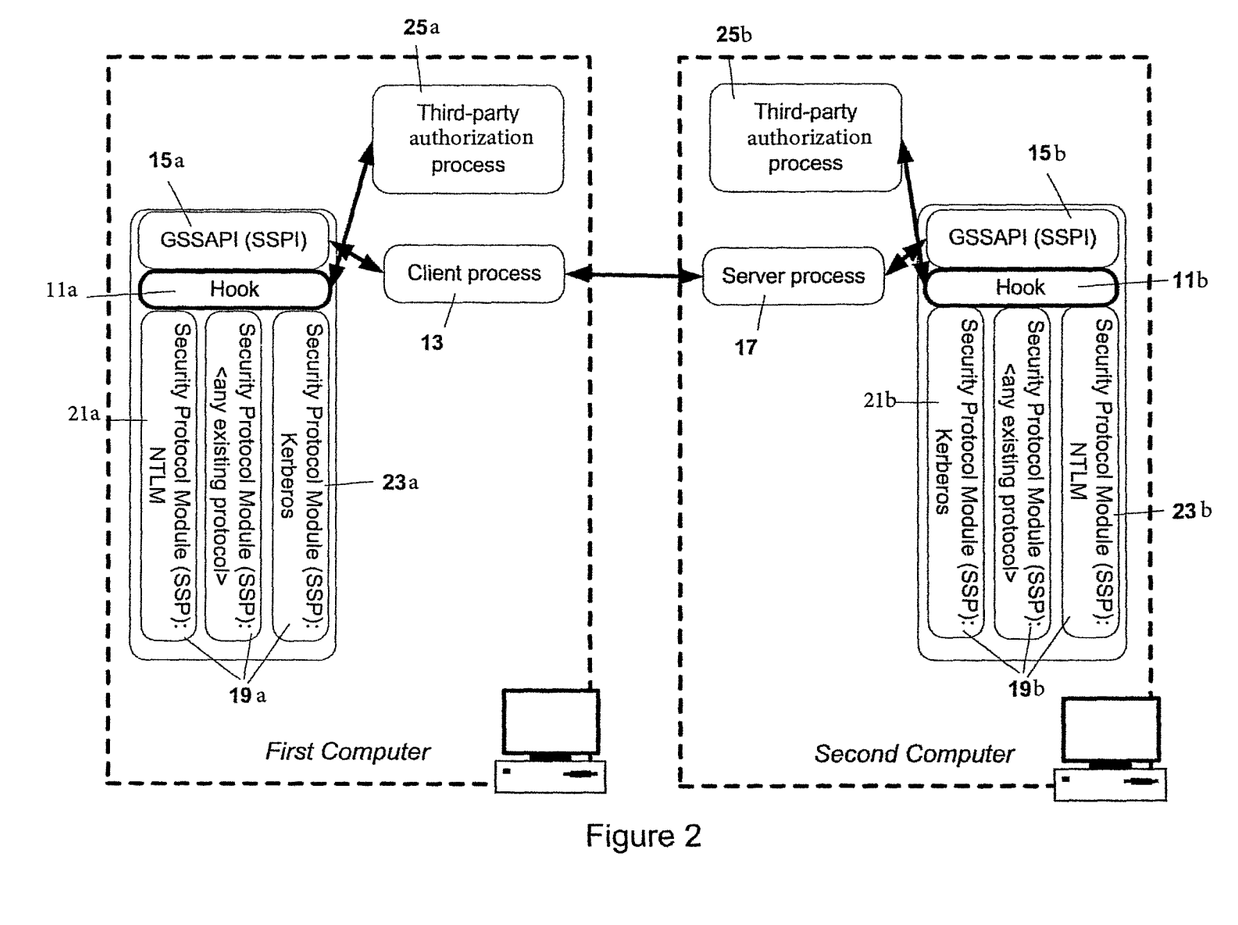
FIG. 2 is a block diagram that shows the components of an embodiment of the invention and their connections to existing OS and GSSAPI components in establishing a security context between computers.

Embodiments of the invention perform their functions using the components shown in FIG. 2.

The Hook

The hook 11a is a custom library that intercepts requests from a client process 13 that would normally go to the GSSAPI 15a to request a security context with a server process 17 running on another computer. This implementation of the invention runs on Windows computers, where the GSSAPI 15a is implemented as a version named the Security Support Provider Interface (SSPI). The SSPI 15a includes a set of security protocol modules 19 that in the Windows environment are named Security Support Providers (SSPs) 19. The SSPI 15a is part of Windows' Local Security Authority (LSA).

The hook 11a in this implementation is an LSA module that sits between Lsasrv.dll, the part of the LSA that receives requests from the client processes for security contexts, and the individual SSPs 19a that carry out the requests. To intercept calls from Lsasrv.dll and the SSPs, the hook 11a registers itself with the LSA as the Kerberos SSP 21a (Kerbeross.dll in the SSPI) and as the NTLM SSP 23a (Msv1_0.dll in the SSPI). The hook also connects to Kerbeross.dll and Msv1_0.dll so that it can pass calls on to those SSPs and receive responses to those calls.

The hook 11a looks at all calls from Lsasrv.dll and passes any calls it is not interested in to the appropriate SSP 19 and passes the SSP's response back to Lsasrv.dll. The hook 11a looks for any calls that have to do with security tokens such as AcquireCredentialsHandle, InitializeSecurityContext, AcceptSecurityContext, CreateTokenEx, and QueryContextAttributes. When the hook detects these calls, it may provide extra processing on the call and, if appropriate, call an SSP 19a to provide processing and then, if desired, provide extra processing on the SSP's response before responding to Lsasrv.dll.

The hook 11a also receives information from a third-party authorization process 25a, in this implementation a role-granting process that informs the hook 11a when the third-party authorization process 25a has granted a user role authorization.

The hooks 11a and 11b must be present on each of two computers where a client process 13 on one computer requests a security context with a server process 17 on the second computer.

Adding Extra Data to a GSSAPI Security Token

Figure 4A:
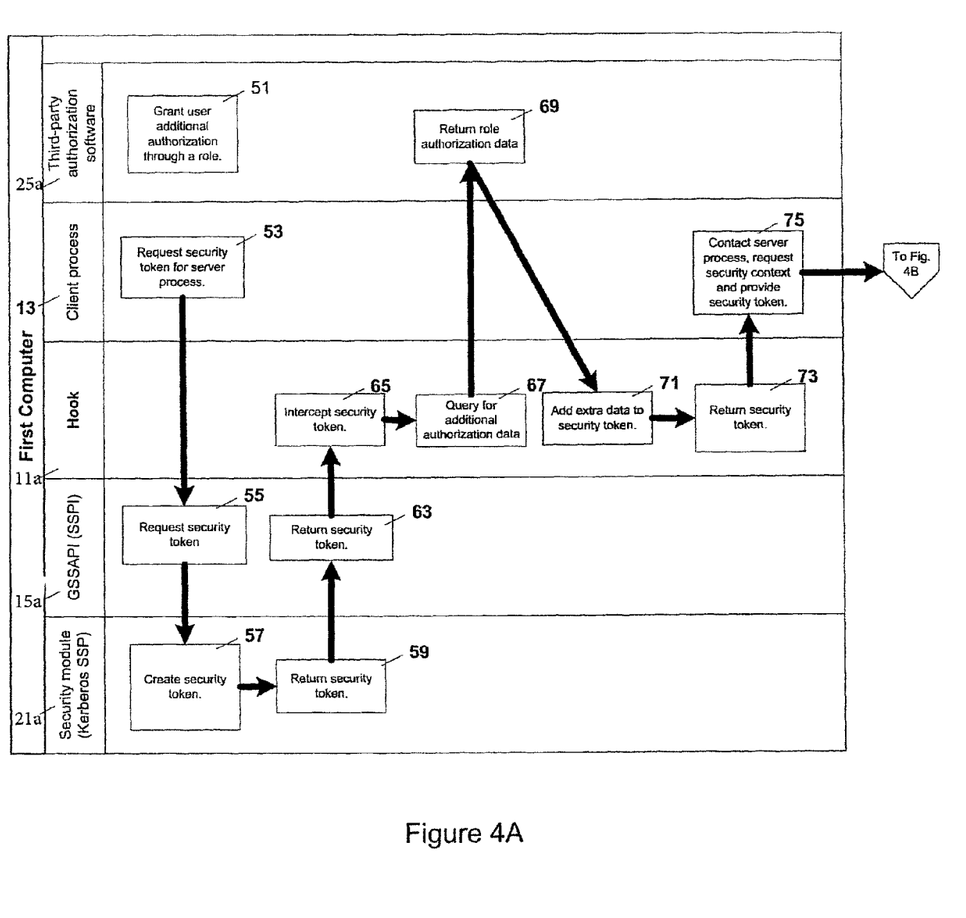
FIGS. 4A and 4B are flowcharts that show how an embodiment of the invention works with an OS and the GSSAPI to transmit non-OS authorization data between third-party processes on two computers as the OS and the GSSAPI establish a security context between the two computers.
Figure 4B:
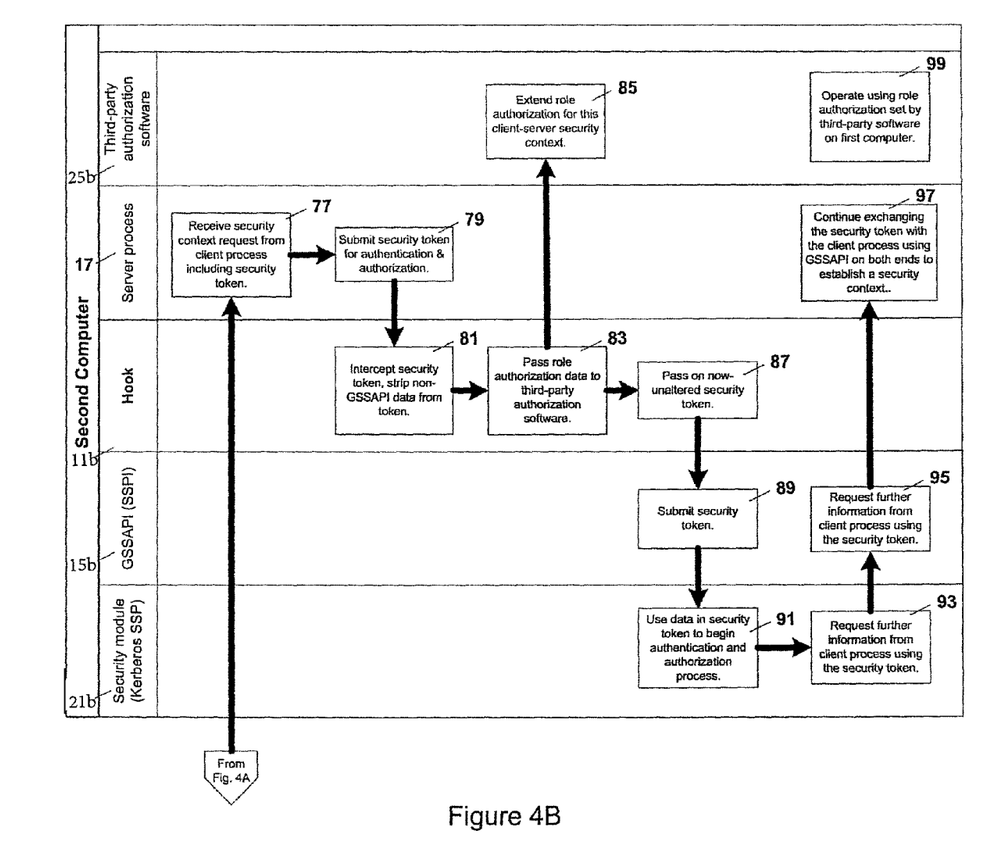

FIGS. 4A and 4B are a flow chart that illustrates the process that occurs when a client process 13 on one computer requests a security context with a server process 17 on another computer, and a third-party authorization process 25a on the first computer has extra authorization data to send to its counterpart on the second computer using an embodiment of the invention to add extra data to a GSSAPI security token.

The third-party authorization process 25a on the first computer grants 51 a user additional authorization when the user assumes a new role using the process 25a.

The user works with a client process 13 that needs data from a server process 17 running on the second computer, so the client process 13 requests 53 a security token from the SSPI 15a to establish a security context with the server process 17. The SSPI 15a in turn requests 55 a security token from the Kerberos SSP 21a.

The Kerberos SSP 21a creates a security token. The Kerberos SSP 21a then returns 59 the security token to the SSPI 15a which in return attempts to return 63 the security token to the client process 13.

The hook 11a intercepts 65 the security token from the SSPI 15a. The hook then queries 67 the third-party authorization software 25 for additional authorization data that defines the user's current role. The third-party authorization software 25 returns 69 the authorization data to the hook 11a. Note that in other implementations of the invention the hook 11a may determine the third-party authorization software's 25a additional authorization data through other means such as noting existing conditions set by the third-party software 25a.

The hook 11a adds 71 extra data to the security token that includes the role authorization data returned by the third-party authorization software 25a. The hook 11a then returns 73 the security token to its intended recipient, the client process 13. The client process 13 then contacts 75 the server process 17 to request a security context. The client process 13 supplies the security token with its request.

The server process 17 receives 77 the security context request from client process. The request includes the provided security token. The server process 17 submits 79 the security token to the SSPI 15b for authentication and authorization.

The hook 11b intercepts 81 the security token and strips off the non-GSSAPI data that was added earlier by the hook 11a on the first computer. The hook 11b passes 83 the role authorization data from the stripped-off data to the third-party authorization software 25b running on the second computer. The third-party authorization software 25b uses the role authorization data to extend 85 role authorization for the user in the requested client-server security context.

The hook 11b passes 87 the now-unaltered, that is, with non-GSSAPI data removed, security token to the SSPI 15b. The SSPI 15b submits 89 the security token to the Kerberos SSP 21b to read data in the token and begin 91 authentication and authorization for the requested security context.

The Kerberos SSP 21b requests 93 further information from the client process using the security token. The SSPI 15b passes that request 95 along with the security token to the server process 17. The server process 17 then continues exchanging the security token with the client process 15. Both processes uses the GSSAPI 15a and 15b to read the token contents and write further data into the token to establish a security context. Once the security context is established, the client process 13 can work with the server process 17 using the authorization specified by the security context.

The third-party authorization software 25b operates 99 simultaneously using the role authorization set by the third-party software 25a operating on the first computer.

Further details regarding the GSSAPI 15a and 15b and security protocol modules 19a and 19b are not set forth herein as such elements are well known in the art and while necessary for complete operation of the invention do not need to be modified for use with the invention.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by any type of processing device.

Although specific examples of how the invention may be implemented are described, the invention is not limited by the specified examples, and is limited only by the scope of the following claims.

I claim:

1. A system for enabling a third party authorization process to provide extended authorization for a security context for a client-server connection for a first computer comprising:
   a generic security service application program interface (GSSAPI) and a client process running on said first computer, said GSSAPI configured to create a security token for said client process to send to a second computer;
   a module running on said first computer configured to intercept the security token created by said GSSAPI, accept non-operating-system authorization data from said third party authorization process to be added to said security token and return said security token with said added data to said client process;
   said client process configured to request a security context using said security token with said added data from a server process running on a second computer, said second computer including a module configured to intercept said security token received from said first computer, remove any non-operating-system authorization data added to said security token by said first computer, pass said non-operating-system authorization data to a third party authorization process running on said second computer, and pass said security token without said non-operating-system authorization data to a GSSAPI running on said second computer, said server process configured to send said security token to said first computer after said GSSAPI running on said second computer has confirmed authentication and authorization for a security context based on said security token.

2. The system defined by claim 1 wherein said first computer is a Windows computer and said GSSAPI running on said first computer is a security support provider interface (SSPI) which includes a set of security protocol modules and is part of a Windows operating system Local Security Authority (LSA).

3. The system defined by claim 2 wherein the module configured to intercept the security token is part of an LSA module which receives the requests from the client process for said security context, and sends said requests to a security protocol module that returns said security context.

4. The system defined by claim 1 wherein the module running on the first computer configured to intercept the security token receives information from the third party authorization process running on the first computer, and a role-granting process of said third party authorization process running on the first computer informs the module when the third party authorization process running on the first computer has granted a user role authorization.

5. The system defined by claim 3 wherein said security protocol module creates said security context credentials by establishing said authentication and authorization with said Windows operating system.

6. A system for enabling a third party authorization process to provide extended authorization for use by a first computer through a security context established through a client-server connection comprising:
   a generic security service application program interface (GSSAPI) and a server process running on a second computer, said GSSAPI configured to submit credentials from security tokens received by said server process from said first computer and confirm authentication and authorization for a security context based on said security token for said server process to send to said first computer;
   a module running on said second computer configured to intercept a security token received from said first computer, remove any non-operating-system authorization data added to said security token by said first computer, pass said non-operating-system authorization data to a third party authorization process running on said second computer, and pass said security token without said non-operating-system authorization data to said GSSAPI;
   said GSSAPI further configured to use said passed security token for authentication and authorization and confirm said authentication and authorization for said server process;
   said authorization process running on said first computer configured to provide extended authorization for said security context based on said removed non-operating-system authorization data, said first computer including a generic security service application program interface (GSSAPI) and a client process, said GSSAPI running on said first computer configured to create a security token for said client process to send to said second computer, said first computer further including a module configured to intercept the security token created by said GSSAPI running on said first computer, accept non-operating-system authorization data from a third party authorization process running on said first computer to be added to said security token and return said security token with said added data to said client process.

7. A method for enabling a third party authorization process to provide extended authorization for a security context for a client-server connection for a first computer comprising:
   requesting a security token for a server process running on a second computer via a generic security service application program interface (GSSAPI) running on said first computer, said GSSAPI creating a security token for a client process running on said first computer to send to said server process;
   intercepting the security token created by said GSSAPI, querying an authorization process running on said first computer for non-operating-system authorization data from said third party authorization process to be added to said security token returning said security token with said added data to said client process;

requesting a security context using said security token with said added data from said server process running on said second computer.

8. A method for enabling a third party authorization process to provide extended authorization for use by a first computer through a security context established through a client-server connection comprising:

receiving by a server process running on a first computer a security context request including security tokens from said first computer;

said server process submitting said received security token for authentication and authorization;

intercepting said security token;

removing any non-operating-system authorization data added to said security token by said first computer;

passing said non-operating-system authorization data to an authorization process running on said second computer;

passing said security token without said non-operating-system authorization data to a generic security service application program interface (GSSAPI) running on said second computer;

said GSSAPI submitting said passed security token for authentication and authorization and confirming said authentication and authorization for said server process;

said third party authorization process providing extended authorization for said security context based on said removed non-operating-system authorization data.

* * * * *